(12) United States Patent
Dronzek, Jr.

(10) Patent No.: US 10,137,677 B1
(45) Date of Patent: Nov. 27, 2018

(54) CELLULOSE FILM PRESSURE SENSITIVE ADHESIVE SUBSTRATES FOR HIGH TEMPERATURE PRINTING

(71) Applicant: Polymeric Converting LLC, Enfield, CT (US)

(72) Inventor: Peter J. Dronzek, Jr., New Milford, CT (US)

(73) Assignee: POLYMERIC CONVERTING LLC, Enfield, CT (US)

( * ) Notice: Subject to any disclaimer, the term of this patent is extended or adjusted under 35 U.S.C. 154(b) by 340 days.

(21) Appl. No.: 15/040,791

(22) Filed: Feb. 10, 2016

Related U.S. Application Data

(60) Provisional application No. 62/114,534, filed on Feb. 10, 2015.

(51) Int. Cl.
| | |
|---|---|
| *B32B 37/12* | (2006.01) |
| *B32B 38/00* | (2006.01) |
| *C09J 7/02* | (2006.01) |
| *B41J 11/00* | (2006.01) |
| *C09J 135/06* | (2006.01) |

(52) U.S. Cl.
CPC ........ *B32B 38/145* (2013.01); *B32B 37/12* (2013.01); *B32B 38/0008* (2013.01); *B41J 11/0015* (2013.01); *C09J 7/0264* (2013.01); *B32B 2317/18* (2013.01); *C09J 135/06* (2013.01); *C09J 2201/606* (2013.01); *C09J 2203/334* (2013.01); *C09J 2205/114* (2013.01); *C09J 2401/006* (2013.01); *C09J 2433/00* (2013.01)

(58) Field of Classification Search
CPC .. B32B 37/12; B32B 38/0008; B41J 11/0015; C09J 7/0264
See application file for complete search history.

(56) References Cited

U.S. PATENT DOCUMENTS

| | | | |
|---|---|---|---|
| 2,884,126 A | 4/1959 | Ulrich | |
| 3,575,911 A | 4/1971 | Peterson | |
| 3,900,610 A | 8/1975 | McKenna, Jr. | |
| 5,888,622 A * | 3/1999 | Pinell | D21H 19/56 346/135.1 |
| 6,224,975 B1 | 5/2001 | Wang | |
| 7,687,125 B2 | 3/2010 | Gavel | |
| 2012/0045604 A1 | 2/2012 | Gavel | |

OTHER PUBLICATIONS

DyTac 9577 Technical Data Sheet dated Feb. 2013.

* cited by examiner

*Primary Examiner* — Daniel McNally
(74) *Attorney, Agent, or Firm* — Hedman & Costigan, P.C.; James V. Costigan; Kathleen A. Costigan

(57) ABSTRACT

A method of printing a single ply transparent or pigmented cellulose film having a top surface and a bottom surface in a high temperature printer:
said method including:
(a) coating the bottom surface of the single ply transparent or pigmented cellulose film with a layer pressure sensitive adhesive and coating said top surface of said cellulose adhesive with a functional top coating while controlling the moisture content of the cellulose film at between 4.5 and 6.5 wt % water, based on the weight of the cellulose layer;
(b) laminating a lay flat liner onto the layer of pressure sensitive adhesive to form a laminated single ply transparent or pigmented cellulose film; and
(c) passing the laminated single ply transparent or pigmented cellulose film through a laser printer to affix printed indicia to the laminated single ply transparent or pigmented cellulose film.

12 Claims, 1 Drawing Sheet

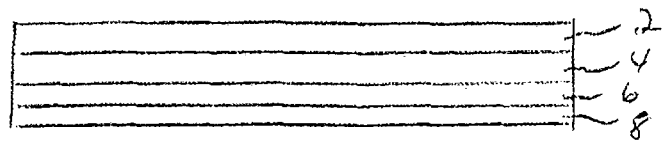

CELLULOSE FILM PRESSURE SENSITIVE ADHESIVE SUBSTRATES FOR HIGH TEMPERATURE PRINTING

FIELD OF THE INVENTION

This invention relates to a cellulose film based substrate and adhesive combination for use as a label in multifunctional conventional printing techniques as well as variable imaging using electronic toner technologies that impart significant heat to the substrate.

BACKGROUND OF THE INVENTION

The present invention relates generally to printable and electronically imageable clear and opaque pressure sensitive adhesive (PSA) coated cellulose substrates for tapes and labels that have a novel print receiver engineered to provide multi-functional print properties of conventional printing techniques as well as variable imaging employing wet or dry toner technologies that require heat to fuse the toner. The substrate is preferably provided with a lay flatness release liner backing that will lay flat through the various printing and imaging processes.

An example of where this invention could be used is a laser printable-pressure sensitive adhesive coated label that is first printed with fixed information using conventional flexographic printing techniques before the label is die cut into sheets of discrete labels for subsequent laser printing of variable information. These labels are made from a single ply of a thin clear cellulosic film substrate coated with a pressure sensitive adhesive. This substrate, for example, could be used in bar coding and price marking applications replacing polyester films or vinyl films mounted on a heavy release liner that acts as a heat sink in the current art. Vinyl films will melt if they jam in the fuser of a laser printer.

Most preferably, the invention relates to a novel single ply substrate that uses a low cost clear or pigmented white heat resistant cellulosic film substrate, a pressure sensitive adhesive, lay flat release liner and a multi-functional print receiver coating. In addition to providing conventional print reception, the receiver coating also provides and helps maintain the electrical properties through all processing needed for toner electrostatic printing, also known as laser printing.

The labels of the current invention can be used as lower cost heat resistant film labels in applications where a heat resistant label is needed, especially in variable imaging processes such as laser printers employing heat fused toner technology. Printed labels comprise an important form of communication for permanent and temporary labeling of various items. Labels are commonly used to convey information in a wide range of applications. While this invention is not limited to any specific market area that would use a heat resistant label and this disclosure is in no way meant to be limiting, shelf labels used in the retail environment familiar to all will be used for illustrative purposes.

For example, in the retail environment, labels are commonly applied to product displays to identify objects and to convey information about those objects to customers such as pricing, product identification, sale details, etc. Product information tends to be dynamic in this environment and product offerings and pricing undergo frequent changes. Point-of-sale product labeling is often changed by applying new labels to the edge of shelves on which the products are displayed. Such shelf labeling is a significant part of the labeling activity in commercial retail establishments and large numbers of labels are used today in retail outlets for shelf edge price marking and promotional labels called shelf talkers. The typical retail market includes aisles of shelves on which identification and price labels are affixed using a pressure sensitive adhesive on the back side thereof which forms a removable bond with the shelf edge. A shelf talker is a special type of product label used for promoting brand identity, units of measure, price comparisons, and special sale pricing and promotions. The shelf talker is usually larger than the shelf label, and is used in addition thereto for increasing the visibility of the particular product being promoted. Shelf talkers are usually made of clear film that is placed over the price marker label and is designed to be removable from the base price label and shelf edge the contact clear label is applied over.

Labels with variable imaging are typically provided in groups of similar die cut size on individual sheets for collectively printing the desired information thereon. Fixed information, such as store identification and product graphics can be pre-printed in large quantities of the sheets in a suitable manner during the production of the die cut labels and variable imaged at a later time or die cut blank labels can be produced that are imaged with fixed and variable information at a later time. Variable information is printed on a common sheet such as the specific product, size, price or promotion information may be locally printed at a service bureau or distribution center that will distribute the labels or they can be printed on-demand at store level using laser, thermal transfer and direct thermal printers.

Due to their typical temporary applications and disposability, shelf labels must be easy to produce, install, remove and be durable to withstand the rigors of the application such as cleaning with various hard surface cleaners. Cost is always a significant factor for the substrate material. Lighter weight functional substrates are preferred for reduced shipping and distribution costs. As many prices and promotions change weekly, new shelf edge labels and shelf talkers are typically sent out by courier. Couriers are now migrating to "Conventional Packaging" where you pay a fixed price for a certain size package with fixed dimensions and an upcharge for excessive weight. A thinner composite of face stock, adhesive and liner will allow for more labels in a box and assist in reducing distribution costs under the new dimensional packaging pricing now used as a standard by most courier services. Because of the sheer volume of these types of labels that are consumed, an environmentally sustainable substrate is preferred.

DESCRIPTION OF THE PRIOR ART

Pressure sensitive film labels for use in printers that require a high temperature substrate that will not soften, melt or curl in the printer apparatus such as a laser printer are typically produced with either heat resistant clear polyester film (PET) label face stock in the 0.002-0.003' thickness range or cast vinyl in the 0.003-0.004" thickness range. Polyester has the heat stability to transport and process through hot running printers like the typical laser printer. Cast vinyl label substrate that is much more heat sensitive requires a heavy basis weight removable paper backing to absorb the heat shock as the material is being processed in a laser printer such as the typical 70-90# poly coated liners that range in thickness from 0.005-0.008" in thickness range. Oriented polypropylene (OPP) does not have the heat stability for hot laser printers because when exposed to high heat, the substrate tends to slightly shrink back to its pre-oriented (pre-stressed) state causing curl of the pressure sensitive laminate. Additionally, OPP will melt if there is a jam in the fuser section of a laser. While OPP is not recommended for use in laser printers, the invention can be practiced for OPP labels that are not exposed to heat that will approach the softening point of OPP, PET, Vinyl and OPP can be used in other variable imaging techniques such as direct thermal, thermal transfer, ink jet, wet toner technologies and toner new generation toner technologies with colder toner fusion mechanisms.

United States Patent Application US2012/0045604 A1 incorporated by reference titled Biodegradable Film With Pressure Sensitive Adhesive Layer assigned to Innovia Films, the largest worldwide cellulose film manufacturer discloses a biodegradable pressure sensitive adhesive substrate comprised of a core layer of cellulose with a biodegradable pressure sensitive layer on one side, a release liner backing covering the pressure sensitive adhesive and optionally a biodegradable print/barrier layer on the side opposite the adhesive. The invention claims that the substrate can be printed by conventional means and by laser printing. The application cites different print receiving layers and barrier layers or a combination layer that are preferably biodegradable. Also described is the ability to print by conventional means and through a laser. The application is not enabling for one skilled in the art because it does not teach or claim the properties that the adhesive, liner and coating need to cumulatively impart to successfully laser print a moisture sensitive substrate of this type. This patent application describes the NatureFlex family of Biodegradable and Compostable films produced by Innovia films as one of their two cellulose film line offerings. The second offering is the Cellophane product line which the Innovia technical literature incorporated for reference) claims Cellophane performs better in high temperature applications. These two product families are manufactured using the same casting processes. Innovia literature states that the difference between NatureFlex and Cellophane is the variations between the base film components and coatings that differentiate the two product lines.

The Fasson® Division of Avery Dennison, a worldwide leader in pressure sensitive substrates markets cellulose film with the Innovia Films trade name NatureFlex™ as the cellulose substrate in clear substrate (AO293 Grade) and white substrate (AM591 Grade).

Fasson® technical literature incorporated for reference states that because of the heat sensitivity of the face stock, drying temperatures need to be reduced to the lowest possible temperature which is opposite what you need for laser printing.

SUMMARY OF THE INVENTION

The invention is directed to a method of printing a single ply transparent or pigmented cellulose film having a top surface and a bottom surface, in a high temperature printer: said method comprising:
(a) coating said bottom surface of said single ply transparent or pigmented cellulose film with a layer pressure sensitive adhesive and coating said top surface of said cellulose adhesive with a functional top coating while controlling the moisture content of the cellulose film at between 4.5 and 6.5 wt % water, based on the weight of the cellulose layer;
(b) laminating a lay flat liner onto said layer of pressure sensitive adhesive to form a laminated single ply transparent or pigmented cellulose film; and
(c) passing said laminated single ply transparent or pigmented cellulose film through a laser printer to affix printed indicia to said laminated single ply transparent or pigmented cellulose film.

The present invention provides a durable heat resistant single ply low cost labeling or packaging film substrate comprising a transparent or pigmented cellulose film made of regenerated cellulose that is coated with a pressure sensitive adhesive composition and a functional top coating where the pressure sensitive adhesive layer is laminated to a lay flat liner. The label substrate has a top surface and a bottom surface where the top surface is coated with a multi-functional coating for printing and preferably a thermal toner imaging coating. The bottom surface has a pressure sensitive adhesive of high shear strength so it does not ooze supported on a release liner backing that exhibits good layflatness.

The cellulose substrate construction of the present invention are primarily intended for use in printing and imaging systems that use high heat, i.e., temperatures of 160° C. to 230° C., for applying indicia such as dry or wet toner laser systems or in thermal printing operations. Suitable dry toner laser based systems are produced by Xerox Corporation, Lexmark, Ricoh, Xiekon and Hewlett Packard and wet toner systems such as the Indigo system produced by Hewlett Packard. The heat fusing of the dry toner technologies requires the use the high temperature substrate that is a thermoset film that has high heat stability at elevated temperature. These laser systems typically operate at temperatures of 180° C. to 220° C. Thermal Transfer and Direct Thermal printers are manufactured by Sato, Seiko, Printronix and Zebra along with many others.

It is an object of the invention to provide a lower cost and more functional label stock for use in printing applications that require a thinner substrate, adhesive and liner combination so more footage can be supplied on a roll and more sheets can be in a stack.

BRIEF DESCRIPTION OF THE DRAWING

FIG. 1 is a diagram of a cross-section of the layers of a clear cellulose film label having a print receiving top coating 2 on a clear cellulose film 4 on a pressure sensitive adhesive 6 in contact with release liner 8.

DETAILED DESCRIPTION OF THE INVENTION

The present invention provides for a heat resistant pressure sensitive label substrate that is based on transparent cellulose film or pigmented opaque cellulose film coated with a multi-functional top coating, on one side, pressure sensitive adhesive on the other side supported on a release coated liner that exhibits good flatness. The terms clear film and transparent film for purposes of this specification are used interchangeably to define a film substrate that allows light to pass through where objects held up against the back surface can be clearly seen.

Opaque film means the property of the film that prevents the transmission of light through the adhesive coated film substrate and prevents the show through of color on the surface the back side of the label is mounted to. Opacity is the ability of a substrate to resist the transmission of light through it and prevents show through of the underlying color or colors below the label. For purposes of this disclosure, sufficient opacity is an opacity that will not impact the readability, bar code scanning or esthetic acceptance of the printed label in the intended application. It is understood that a greater opacity is needed if the label is applied over a black surface versus a lighter colored surface. Opacity for purposes of this invention can be a pigmented cellulose film, pressure sensitive adhesive filled with opacifying pigment or a functional printable top coating filled with pigment.

Layflatness means the curl resistant property of a paper, film or laminate that is usually measured by a visual comparison with a standard under controlled conditions.

The phrase dried adhesive layer means the resulting adhesive layer after water or solvent is evaporated from an aqueous or solvent based adhesive respectively or it is the 100% solids layer of a hot melt or UV curable adhesive matrix.

Heat stability for the present invention means that the substrate and adhesive of the present invention when mounted to a release liner will process through high temperature printers such as laser printers used in the current art without melting, shrinking and jamming in the printer due to distortion of the face stock or ooze of the adhesive under the printing conditions with good layflatness (only minimal curl). This means slight curl of the laminate may be seen an exiting the printer but this will flatten quickly as the composite cools and comes back to equilibrium.

Printable by conventional techniques means the substrate can be printed by gravure, flexographic or offset printing techniques directly or through the use of a print receiving primer.

Electronically imageable printing techniques means printable by Toner Technology (laser dry toner or Indigo wet toner), Ink Jet thermal transfer or direct thermal directly or through the use of a print receiving coating designed for the specific electronic imaging technology.

Laser printing is also called electrostatic toner imaging and in a general sense, functions as follows:

1—Initially, the printer drum is given a total positive charge by the charge corona wire, a wire with an electrical current running through it or a charged roller instead of a corona wire. As the drum revolves, the printer shines a tiny laser beam across the surface to discharge certain points. In this way, the laser "draws" the letters and images to be printed as a pattern of electrical charges known as—an electrostatic image 2—After the pattern is set, the printer coats the drum with positively charged toner that is a fine, black powder in monochrome printers or cyan, magenta, yellow and black in color laser printers. Since the charged toner has a positive charge, the toner clings to the negative discharged areas of the drum, but not to the positively charged "background."

3—With the powder pattern affixed, the drum rolls over a sheet of substrate to be printed, which is moving along at the same speed as the drum. Before the substrate rolls under the drum, it is given a negative charge by the transfer corona wire or charged roller. This charge is stronger than the negative charge of the electrostatic image, so the substrate can pull the toner powder away. Since it is moving at the same speed as the drum, the substrate picks up the image pattern exactly. To keep the substrate from clinging to the drum, it is discharged by the detac corona wire immediately after picking up the toner.

4—Lastly, the substrate passes through the fuser, a pair of heated rollers. As the substratae passes through these rollers, the loose toner powder melts together and fuses with the substrate or the coating on the surface of the substrate. The fuser rolls the substrate paper to the output tray.

5—The fuser also heats up the substrate which is why pages are always hot when they come out of a laser printer or photocopier.

6—After depositing toner on the substrate, the drum surface passes the discharge lamp. This bright light exposes the entire photoreceptor surface, erasing the electrical image. The drum surface then passes the charge corona wire, which reapplies the positive charge.

In a color laser printer the substrate goes through four fusing sections and has four times the thermal history.

Adhesive tack is the sticky property of the adhesive coating measured by the peel force from a substrate.

Adhesive, ooze, cold flow or creep resistance means that the filled pressure sensitive adhesive is less prone to building up on cutting dies, does not edge weld, resists cold flow under pressure such as when wound in a roll, resists oozing under the weight of stacks of sheets and does not ooze in individual sheets fed through the hot fusing section of a laser printer as the adhesive gets softer when heated.

Cold flow or adhesive creep is the shifting (flow) of adhesive that bonds the substrate to the release liner due to conditions that exceed the resistance limits of the adhesive used.

Cold fusion laser printers systems typically run continuous forms and employ lower temperature toner fusing technology and have a chill plate after heat fusing the toner to cool the substrate.

Flash Fusion laser printers systems typically run continuous forms and employ lower temperature fusing technology and heat fuse the toner with a flash of energy so the fusing section is not always up to temperature and transfers much less heat to the substrate versus systems where the fuser is always at temperature. Typical systems use a Xenon lamp light source as the fusing mechanism to provide the heat energy to melt fuse the toner.

The term cellulose film means a film that is produced from wood pulp or cotton and is an excellent option for making a film for use in the present invention. Cellulose film is a thermoset film and does not melt. Cellulose film also has high stiffness at thin gauges and will allow for thin films to be used and easily handled. Cellulose is a sustainable material that is produced from wood pulp from managed tree farms. Cellulose film is also available in transparent, opaque pigmented white or translucent colored versions as well as coated and uncoated formats available from Innovia Films, Smyrna Ga. under the trade name Cellophane™ and Futamura Chemical Co., Ltd, Osaka Japan. Cellulose film has excellent clarity if not pigmented, heat resistance and strength but tears easily and is moisture sensitive unless it is coated to seal it and inhibit or block moisture transmission. Coated versions of cellulose film that inhibit moisture transmission are most preferred and can be supplied with nitrocellulose, acrylic and PVDC coatings.

Cellophane is relatively stiff and may be used as a thinner film that other polymeric films. Nominal thicknesses in the range of 0.00075" to 0.0018", and preferably about 0.0012" can be used to match the hand of a 3 mil flexible vinyl film. Cellulose is receptive to many types of coating and adhesive polymers and can be sourced with many different surface treatments such as acrylic coatings to promote adhesion of inks, PVDC coatings for barrier properties, nitrocellulose coatings for surface modification and other types of functional coatings. The Innovia Films brochure "Cellulose Films Product Range for Packaging" (dated August 2012) is hereby incorporated by reference. Special mention is made of a combination coating PD969LP available from Process Resources Corp., Thornwood, N.Y. that acts as a moisture barrier coating to seal the printable surface of the cellophane provides enhanced printability by conventional means, is imageable by laser toner technology and controls the surface resistivity, volume resistivity and the coefficient of-friction of coated cellulose for optimum imaging and transport of the substrate using electrostatic toner imaging technology.

In terms of thickness, the substrate including the cellulose film and contact clear or transparent pressure sensitive adhesive should have a combined thickness from about 0.002" to 0.005" and preferably about 0.0015" to 0.0035" for ease of hand or automatic application of the label.

In labeling, the typical adhesive thickness for labels being applied to smooth surfaces requires an adhesive deposition of from 0.0004 to 0.0012" (10-30.5 microns) in thickness and 0.001-0.0025" (25.4-63.5 microns) for more textured surfaces.

Pressure sensitive adhesive polymers that can be used to practice this invention are available from Momentive Performance Materials, Roebuck, S.C. under the Synthebond™ trade name, from Franklin International, Columbus, Ohio under the Covinax™ trade name, from Arkema, Cary, N.C. under the Encor trade name, Avery Dennison Performance Polymers Division, Mill Hall, Pa. or Henkel Adhesives, Bridgewater, N.J. under the Gelva trade name. Pressure sensitive adhesives are well known and are commercially available. U.S. Pat. No. 2,884,126 and U.S. Pat. No. 3,575,911, which are incorporated by reference, provide examples of pressure sensitive adhesives. Crosslinking agents, such as those disclosed in U.S. Pat. No. 3,900,610, which is incorporated by reference, can be formulated into the adhesive to improve the toughness, durability and cohesiveness of the coating matrix as well as adhesion to the substrate if the adhesive is coated directly onto the substrate.

In a preferred embodiment, Avery Dennison E5590 permanent emulsion acrylic adhesive that has excellent cold temperature performance across a broad variety of substrates to be labeled including low energy substrates has been found to be an excellent choice as a removable adhesive of the present invention.

While the referenced adhesive systems are all aqueous based, this invention is not limited to the use of aqueous pressure sensitive adhesive systems and can use solvent based, 100% solids rubber+resin hot melt systems, 100% solids warm melt acrylic systems and 100% solids energy curable systems.

The key to successfully imaging the pressure sensitive cellulose substrate of this invention are as follows:

1—The multi-functional top coating that receives conventional indicia also receives toner, seals and controls the moisture content of the cellulose film for best mechanical film properties, controls the volume and surface resistivity for optimum electrostatic imaging and coefficient-of-friction (COF) control.

2—The choice of the proper pressure sensitive adhesive that does not, cold flow, ooze or creep.

3—The choice of the liner that provides for optimum support of the film, layflatness, COF control for the best feeding and handling characteristics in the laser printer.

The surfaces of the cellulose film can be enhanced to for coating and printing. This enhancement can come in basic forms such as corona, flame or plasma treatment in line with manufacturing or coating of the film to promote adhesion of the adhesive system, primer or printable top coating.

The functional coating includes resins formulated to allow the cellulose film to process in electronic imaging applications, especially laser printing applications. The coating provides the following functionality:

Protective Moisture Barrier—Acts as a barrier to control the moisture sensitivity of the cellulose substrate. The moisture content of cellulose films as received is typically between 6-7%. The moisture needs to be controlled to maintain the mechanical film properties and more importantly to electrostatically image properly. If the moisture content drops below 4%, the film can become brittle and fracture more readily on removal of the label. If the moisture content goes over 9%, the film can become stretchier as the water acts as a plasticizer. Wide swings in moisture content of the film structure will cause variability in electrostatic imaging at fixed print driver settings. The goal of the coating and any primers applied before the functional coating is to control the moisture content at a stable level in equilibrium between 4.5-6.5% and more preferably between 5.0-6.0%. before printing. After printing, especially through a color laser with four separate fuser sections that will impart significant heat history, the moisture content may drop after printing but should come back to equilibrium. Moisture control is also important to control curl. If excessive moisture is lost from the print side of the pressure sensitive composite, the sheet may curl towards the print. The moisture level may be adjusted by placing the cellulose film in a humidity chamber for a sufficient period of time under suitable conditions that the final result will a cellulose film with a moisture content of 4.5-6.5 wt % based on the total weight of the cellulose film including the moisture content.

Conventional Ink And Toner Receiver—the functional coating receives conventional ink (aqueous, solvent or energy curable) and toner.

COF Control—In combination with the back side of the liner, the functional coating helps control the COF between the printable surface and back side of the liner to between 0.35-0.0.55 for optimum sheet feeding in a sheet fed printer.

Volume And Surface Resistivity Control—If the electrical volume resistivity of the composite sheet or the surface resistivity of the image side with print receiver is too high, the print may have print distortion because unwanted charges may move the toner to where it is not supposed to be. This is also called toner scatter. If the resistivity is too low, there may be deletions or missing toner because the charge placed on the receiver surface to transfer toner conducts away too rapidly. Volume or bulk resistivity of the composite label structure should be less than $10 \times 15$ ohms-cm., preferably $10 \times 9$-$10 \times 14$ ohms-cm. and most preferably $10 \times 11$-$10 \times 12$ ohms-cm. Surface resistivity should be less than $10 \times 14$ ohms/square, preferably in the range of $10 \times 9$-$10 \times 13$ ohms/square and most preferably $10 \times 11$-$10 \times 12$ ohms/square at the target 5.0-6.0 moisture range. Surface resistivity can be measured with Monroe Electronics Model 262A Surface Resistivity Meter and Volume Resistivity can be measured with Monroe Electronics Model 272A Volume Resistivity Meter after conditioning the test specimen for 30 minutes at 50% Relative Humidity.

The print receiving layer is coated on the side opposite the adhesive at a coat weight from 0.2-20 grams/MSI (MSI=1000 sq. in.) applied on the top surface of the cellulose film.

Optional general purpose acrylic print primer BP9050 available from Process Resources Corp, Thornwood, N.Y. at 0.25-1.5 gram/MSI coat weight may be applied before the conventional print receiver.

The moisture level in the cellulose core may be controlled after coating by including in the print receiving or laser receiving layer an effective amount of a humecant containing a glycol, e.g., polyethylene glycol 400, glycerin or any other suitable glycol with or without kaolin clay or silica may be used. Amounts such as 0.1 to 1.5 grams/sq·m. of coat weight may be used and one skilled in the art may determine the optimum amount that may be used by simple experimentation. An anti-static agent may be used in the print receiving or laser receiving layer in an amount that is effective to reduce or prevent static events. Suitable anti-static agents include sulfonated polystyrene available from Akzo Nobel, Chicago, Ill. as Versa-TL72 and TOYOSOL ASA-102 available from Toyo Chemicals, Tokyo, Japan A laser receptive coating such as PD969LP that contains an acrylic-urethane polymer with a kaolin clay matting agent and humectants for moisture control is available from Process Resources Corp., Thornwood, N.Y. This material may be used at 0.65-1.5 grams/sq·m. coat weight. Special mention is made of this multi-functional coating when applied to cellophane which not only acts as a barrier to seal the moisture sensitive substrate but also imparts printability by conventional techniques and toner technology. The coating also aids in controlling moisture content, resistivity properties and COF. This one coating system can replace a two coating system where one coating such as acrylic, PVC, PCDC or nitrocellulose is applied as a barrier and then another coating for ink and toner receptivity is applied over it.

Adhesive—The pressure sensitive adhesive selected needs to be firm under heat and pressure so it does not ooze under the heat and pressure of the laser fusing section and does not cold flow or creep causing edge welding or blocking when the pressure sensitive laminate is wound in rolls or stacked in sheets that. Covinax SMA-01 and SMA-02 from Franklin International are vinyl acrylic polymers developed for removable applications including shelf edge labels requiring cold temperature and room temperature functionality. An external crosslinker can be used to increase cohesive strength. Special mention is made of moisture and blush resistant pressure sensitive adhesive polymers such as Encor 9825 available from Arkema that have hydrophobic properties after being dried that can act as a moisture barrier on the adhesive side inhibiting moisture transfer through the adhesive as compared to conventional pressure sensitive adhesives.

Liner—The choice of release liner is critical for release, layflatness and feeding. The release needs to be firm so die cut labels do not come loose and pre-dispense in the laser printer but are still easy to be removed by hand. A release level of 30 grams/in.-200 grams/in. and preferably 50 grams/in. to 100 grams/in. is preferred. A coated paper liner is preferred for feeding purposes but film liner or a film paper composite can be used to increase moisture barrier as well. The paper can be coated on the side opposite the silicone or both sides before silicone coating to seal the paper to make it more moisture resistant under changing environmental conditions and to provide a coated non-silicone surface that provides tooth for optimum feeding. Tooth is defined as rough surface finish characteristics of the coated paper which in this case also provides an air gap for sheet separation. The silicone coated side if pre-coated to seal it, cannot have tooth and must be smooth and uniform for consistent smooth release and to be a good die cutting base. Tooth can be added to the non-silicone side of a film liner by coating it with a particle filled coating. Special reference is made of a composite release liner made up of a thin silicone coated polyester film release liner between 0.00048" and 0.00142" laminated with an adhesive to a tissue paper with a basis weight of 5-20#/ream. The polyester film provides a smooth release and barrier on a high tensile strength film and the tissue provides low COF and sheet separation for feeding.

Example 1

On the pilot coater, Covinax SMA-01 with 0.15% CX-100 Aziridine crosslinker from DSM NeoResins was coated on Cellulose film from Innovia Films using uncoated grade Cellotherm 400 and nitrocellulose coated grade 320 MF at 0.00065" adhesive thickness and was laminated to 53# (0.0029") clay coated paper laser release liner from Itasa Release Liners with nominal 80 gram release.

PD969LP multi-functional coating was applied to the side opposite the adhesive at 1.1 gsm.

The composite sheet was cut into sheets with 12 discrete labels per sheet. Stacks of sheets were evaluated through various laser printers for imaging characteristics and lay flatness. Print driver settings could be found on all units to allow for exceptional printing of monochrome and color graphics and minimal output curl. Feeding characteristics were excellent.

Pre-print, both surface resistivity and volume resistivity were measured at 10×11 ohms/sq. and 10×11 ohms-cm. respectively. Immediately after fusing the resistivity values jumped one decade but came back to equilibrium within the hour. There was slight curl on exiting the fuser but not enough to interfere with the printing process. The coated cellulose/film/adhesive/liner composite flattened out when it came back to equilibrium.

The invention claimed is:

1. A method of printing a single ply transparent or pigmented cellulose film having a top surface and a bottom surface in a high temperature printer:
    said method comprising:
    (a) coating said bottom surface of said single ply transparent or pigmented cellulose film with a layer of pressure sensitive adhesive and coating said top surface of said single ply transparent or pigmented cellulose film with a functional top coating while controlling the moisture content of the single ply transparent or pigmented cellulose film at between 4.5 and 6.5 wt % water, based on the weight of the single ply transparent or pigmented cellulose film;
    (b) laminating a lay flat liner onto said layer of pressure sensitive adhesive to form a laminated single ply transparent or pigmented cellulose film; and
    (c) passing said laminated single ply transparent or pigmented cellulose film through a laser printer to affix printed indicia to said laminated single ply transparent or pigmented cellulose film.

2. The method of printing a single ply transparent or pigmented cellulose film as defined in claim 1 wherein the high temperature printer is a laser printer.

3. The method of printing a single ply transparent or pigmented cellulose film as defined in claim 2 where the top coating is a laser receptor coating.

4. The method of printing a single ply transparent or pigmented cellulose film as defined in claim 2 where the laser printer is a color printer with four printing stations.

5. The method of printing a single ply transparent or pigmented cellulose film as defined in claim 1 wherein said laminated single ply transparent or pigmented cellulose film has a volume resistivity and said volume resistivity is controlled by controlling the moisture content of said single ply transparent or pigmented cellulose film.

6. The method of printing a single ply transparent or pigmented cellulose film as defined in claim 5 wherein the volume resistivity is controlled to between 10×9 to 10×14 ohms-sq·cm.

7. The method of printing a single ply transparent or pigmented cellulose film as defined in claim 5 wherein the moisture is controlled by adding an effective amount of a humectant comprising a glycol.

8. The method of printing a single ply transparent or pigmented cellulose film as defined in claim 1 wherein said functional top coating on said single ply transparent or pigmented cellulose film is a print receiving coating having a surface resistivity and said surface resistivity is controlled by modifying said print receiving coating having a surface resistivity that is applied to said single ply transparent or pigmented cellulose film by varying the amount of a humectant.

9. The method of printing a single ply transparent or pigmented cellulose film as defined in claim 8 wherein the surface resistivity is controlled to between 10×9 to 10×14 ohms-sq·cm.

10. The method of printing a single ply transparent or pigmented cellulose film as defined in claim 1 wherein a print primer or sealer is applied to the top surface before the functional top coating is applied.

11. The method of printing a single ply transparent or pigmented cellulose film as defined in claim 1 wherein the top surface of the single ply transparent or pigmented cellulose film is enhanced for coating by the application of a corona, flame or plasma treatment prior to coating.

12. The method of printing a single ply transparent or pigmented cellulose film as defined in claim 1 wherein said functional top coating on said single ply transparent or pigmented cellulose film is a print receiving coating having an anti-static agent in an amount that is effective to prevent static events.

* * * * *